L. C. ERBES.
TRACTOR.
APPLICATION FILED APR. 19, 1918.
1,332,977.
Patented Mar. 9, 1920.
2 SHEETS—SHEET 2.
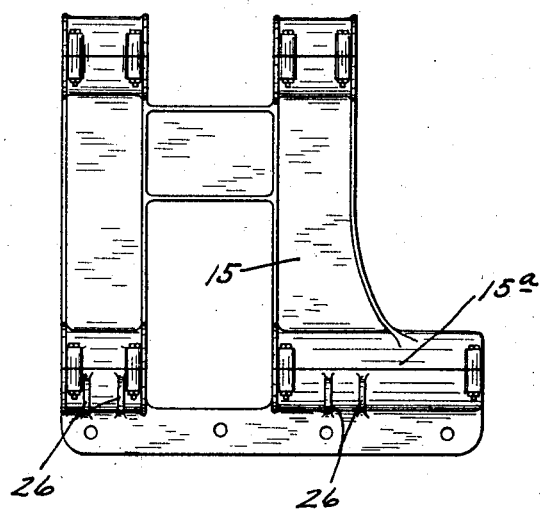
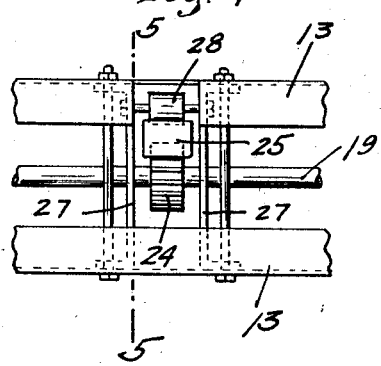
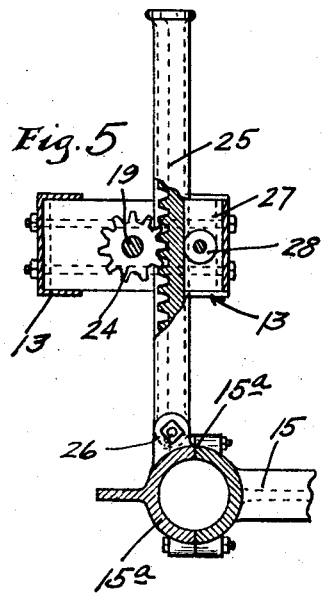
WITNESSES.
H. S. Opsahl.
E. C. Wells
INVENTOR.
L. C. ERBES.
BY HIS ATTORNEYS
Williamson & Merchant

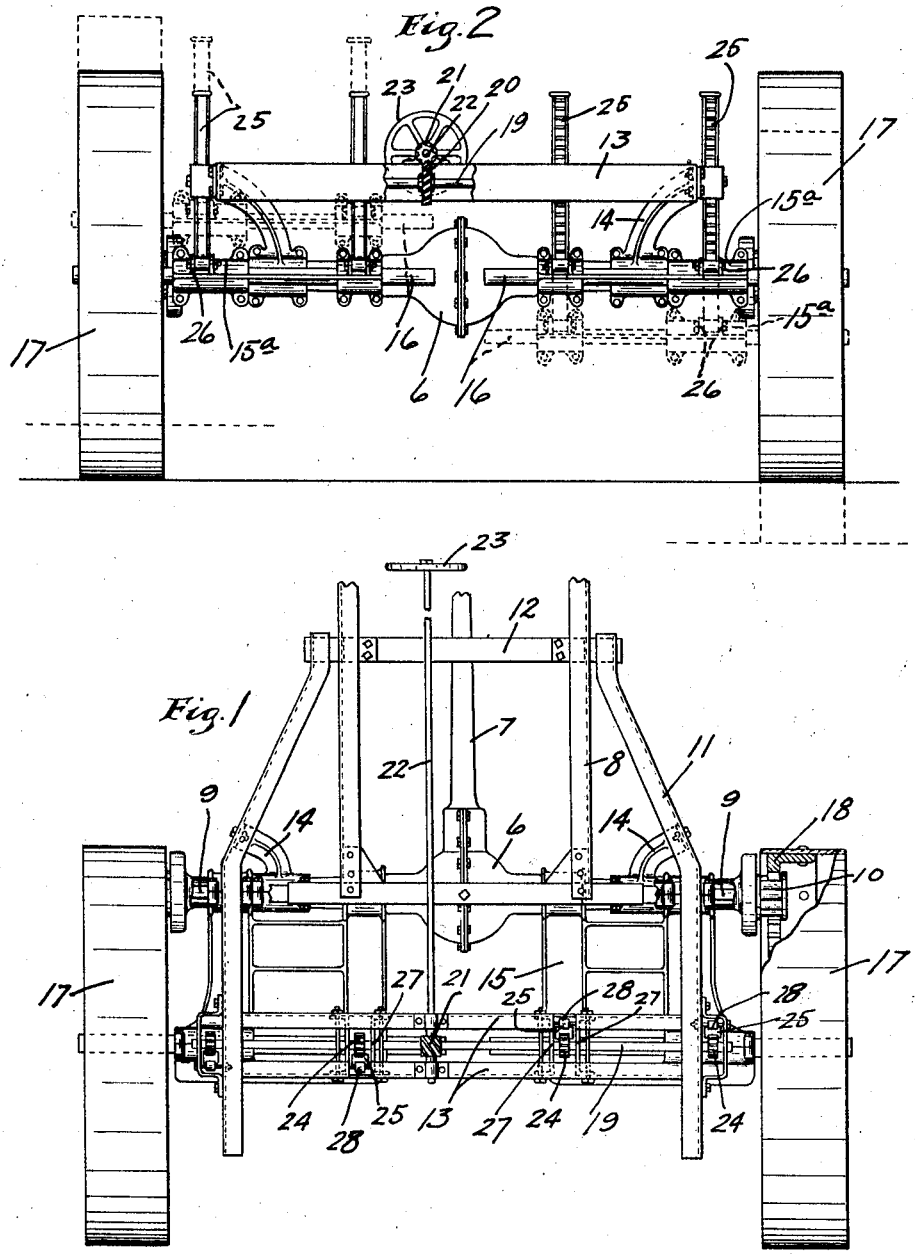

UNITED STATES PATENT OFFICE.

LOUIS C. ERBES, OF ST. PAUL, MINNESOTA.

TRACTOR.

1,332,977. Specification of Letters Patent. Patented Mar. 9, 1920.

Application filed April 19, 1918. Serial No. 229,625.

*To all whom it may concern:*

Be it known that I, LOUIS C. ERBES, a citizen of the United States, residing at St. Paul, in the county of Ramsey and State of Minnesota, have invented certain new and useful Improvements in Tractors; and I do hereby declare the following to be a full, clear, and exact description of the invention, such as will enable others skilled in the art to which it appertains to make and use the same.

My present invention relates to tractors and involves certain features disclosed and broadly claimed in my companion application, S. N. 229,626 filed of date, April 19, 1918, and entitled "Tractor."

Particularly, the present invention is directed to that type of tractor which is made by converting an automobile, such as a Ford, for example, into a tractor by substitution of traction wheels and certain coöperating devices.

The invention is illustrated in the accompanying drawings wherein like characters indicate like parts throughout the several views.

Referring to the drawings:

Figure 1 is a plan view of the tractor with some parts sectioned and with the forward portion, which may be of any approved construction such as the standard automobile construction, removed;

Fig. 2 is a rear elevation of the parts shown in Fig. 1;

Fig. 3 is a plan view of one of the frame-like so-called radius arms;

Fig. 4 is a plan view of one of the devices for vertically adjusting the radius arms; and Fig. 5 is a section taken approximately on the line 5—5 of Fig. 4, some parts being broken away.

Of the parts of the ordinary or standard automobile construction in so far as they are shown, the numeral 6 indicates the crank shaft casing, the numeral 7 the driving shaft tube, and the numeral 8 indicates the rectangular main frame. The divided rear axle 9 of the automobile is left in place, but the ordinary traction wheels removed, and in lieu thereof driving pinions 10, preferably of the lantern gear type, are applied on the outer rims of the said axles so that in the transformed tractor the said divided rear axle is utilized as a divided jack shaft.

Detachably, but rigidly bolted, or otherwise secured to the rear portion of the main frame 8 is a supplemental frame made up, as shown, of side bars 11, front cross bar 12 and longitudinally spaced transverse rear bars 13. The front bar 12 is secured, preferably by bolts, to the side bars of the main frame 8. The intermediate portions of the side bars 11 are secured to the upper ends of brackets 14, the sleeve-like lower ends of which are rigidly clamped onto the rear axle casing 6.

Approximately rectangular frame-like radius arms 15, at their front ends have prongs formed with divided sleeves 15$^a$ that embrace the rear axle casing 6 and pivotally mount the said arms for vertical pivotal movements. At their free or rear ends, the said arms 15 are formed with axially alined, laterally spaced sleeves, preferably also divided and bolted together, and clamped onto the sections 16 of a divided rear axle. The rear traction wheels 17 of the tractor are secured on the outer ends of the axle sections 16, but may be otherwise journaled to the free portions of the radius arms. It will, of course, be understood that the sections 9 of the divided axle which now serves as a jack shaft are driven through the ordinary differential gear mechanism of the automobile proper. The heretofore noted pinions 10 mesh with large annular internal gears 18 rigidly secured to the rims of the traction wheel 17. The radius arms 15 are, of course, held against lateral or sliding movements on the rear axle casing and, as shown, this is accomplished by the hubs of the pinions 10 and the sleeves of the brackets 14. Also, of course, the sections 13 of the rear axle proper are held against axial movements in the radius arms.

For vertically adjusting the radius arms 15 I preferably provide the following devices:

The numeral 19 indicates a transverse adjusting shaft located between the rear frame bars 13 and mounted in suitable bearings on said bars and on the side bars 11. At its central portion this adjusting shaft 19 is provided with a worm gear 20 that meshes with a worm 21 on the lower end of an adjusting shaft 22 which shaft is journaled in suitable bearings on the bars 13, and is provided at its front end with a hand wheel 23. On each side of the worm gear 20, the shaft 19 is provided with two spur pinions 24. These spur pinions 24 mesh with rack bars 25 which at their lower ends are pivotally connected to lugs 26 on the sleeve-like ends 15ª of the respective radius bars 15 (see particularly Fig. 5). The said rack bars 25 are guided by brackets 27 secured on the bars 11 and by rollers 28 journaled to said brackets and to said bars and engage the backs of the rack bars. This duplex arrangement of the racks and pinions is desirable because it equalizes the strain of the opposite sides of the respective frame-like radius arms, but a single rack bar and pinion for each radius arm would operate.

It is now important to note that the rack bars for the two radius arms are on opposite sides of the respective pinions, towit, as shown, the righthand rack bars 25 are in front of the pinions and the lefthand rack bars 25 are at the rear of the pinions. With this arrangement, as is evident, when the adjusting shaft 19 is rotated in a constant direction, one of the radius arms 15 will be lowered, while the other will be raised. Obviously, when the radius arms are in alinement, or at the same elevation, the two traction wheels will be set at the same height with the truck frame horizontal or level. When, however, it is desired to run one of the traction wheels in a furrow, for example, while the other is run on plowed ground, the wheel to run in the furrow will be lowered to such an extent as will leave the truck frame level. Also in running on a steep side hill, it is an easy matter to keep the truck frame level by the adjustment of the traction wheels. It is also evident that under the various adjustments of the traction wheels the radius arms 15 keep the pinions 10 always in proper mesh with the coöperating gears 18, for the reason that said radius arms not only have a pivotal movement on the rear axle casing 6, but move pivotally around the projected axes of the traction wheels 17.

In converting an ordinary automobile into a tractor, the rear wheels of the automobile are removed and the pinions 10 secured to the ends of the said rear axle as substitutes for the removed traction wheels. Then the supplemental frame of the attachment and the radius arms thereof are connected to the rear axle casing and thus the transformation into the tractor is accomplished. Of course, the body of the automobile should be and usually will be removed although this may not always be necessary.

The attachment described is of comparatively small cost, and affords not only a highly efficient, but comparatively cheap means for converting an automobile, temporarily, or otherwise, into a tractor, or into a heavy truck such as will be found serviceable for farm use, or for many other purposes.

What I claim is:

1. The combination with a frame, rear axle casing and divided rear axle of an automobile, of a supplemental frame secured to said main frame, pinions applied to the ends of the divided rear axle whereby the latter is converted into a divided jack shaft, radius arms pivotally mounted on said rear axle casing, main traction wheels journaled to said radius arms, and gears carried by said main traction wheels and meshing with said pinions.

2. The combination with a frame, rear axle casing and divided rear axle of an automobile, of a supplemental frame secured to said main frame, pinions applied to the ends of the divided rear axle whereby the latter is converted into a divided jack shaft, radius arms pivotally mounted on said rear axle casing, main traction wheels journaled to said radius arms, gears carried by said main traction wheels and meshing with said pinions, and means for vertically adjusting and locking at least one of said radius arms in respect to the other.

3. The combination with a frame, a rear axle casing and divided rear axle of an automobile, of a supplemental frame secured to said main frame, pinions applied to the ends of the divided rear axle whereby the latter is converted into a divided jack shaft, radius arms pivotally mounted on said rear axle casing, main traction wheels journaled to said radius arms, gears carried by said main traction wheels and meshing with said pinions, rack bars attached at the rear ends to the free portions of said radius arms and rising therefrom, an adjusting shaft mounted on said supplemental frame and provided with pinions meshing with said rack bars, and means for rotating and locking said adjusting shaft.

4. The combination with a frame, a rear axle casing and divided rear axle of an automobile, of a supplemental frame secured to said main frame, pinions applied to the ends of the divided rear axle whereby the latter is converted into a divided jack shaft, radius arms pivotally mounted on said rear axle casing, main traction wheels journaled to said radius arms, gears carried by said main traction wheels and meshing with said pinions, rack bars attached at the rear ends to the free portions of said radius arms and rising therefrom, an adjusting shaft mounted on said supplemental frame and provided with pinions meshing with said rack bars, and means for rotating and locking said adjusting shaft, the rack bars, which adjust different radius arms being on opposite sides of coöperating pinions whereby one of said radius arms will be raised while the other is being lowered.

5. In a tractor, the combination with a frame, of a rear axle casing carried by said frame, a divided axle structure journaled in the said casing and acting as a jack shaft and having pinions applied to the outer ends thereof, frame-like radius arms pivoted on said rear axle, main traction wheels journaled to the free portions of the said radius arms and provided with internal gears meshing with said pinions, and means for adjusting vertically one of the said radius arms in respect to the other.

6. In a tractor, the combination with a frame, of a rear axle casing carried by said frame, a divided axle structure journaled in the said casing and acting as a jack shaft and having pinions applied to the outer ends thereof, frame-like radius arms pivoted on said rear axle, main traction wheels journaled to the free portions of the said radius arms and provided with internal gears meshing with said pinions, means for adjusting vertically one of the said radius arms in respect to the other, said means comprising a transverse adjusting shaft, means for rotating and locking said adjusting shaft on rack bars attached to the free portions of said radius arms and rising therefrom, guides on said frame for the upper portions of said rack bars, and pinions on said adjusting shaft meshing with the teeth of said rack bars, the rack bars that adjust different radius arms being on opposite sides of coöperating pinions.

In testimony whereof I affix my signature in presence of two witnesses.

LOUIS C. ERBES.

Witnesses:
CLARA DEMAREST,
EVA E. KÖNIG.